US011927999B2

(12) United States Patent
Faasse et al.

(10) Patent No.: US 11,927,999 B2
(45) Date of Patent: Mar. 12, 2024

(54) SERVER NETWORK INTERFACE CARD-LOCATED BASEBOARD MANAGEMENT CONTROLLERS

(71) Applicant: HEWLETT PACKARD ENTERPRISE DEVELOPMENT LP, Houston, TX (US)

(72) Inventors: Scott P. Faasse, Houston, TX (US); David F. Heinrich, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/450,860

(22) Filed: Oct. 14, 2021

(65) Prior Publication Data

US 2023/0119437 A1    Apr. 20, 2023

(51) Int. Cl.
*G06F 1/26* (2006.01)
*G06F 13/42* (2006.01)

(52) U.S. Cl.
CPC ............ *G06F 1/26* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,424,419 B1* | 9/2008 | Fike | ...................... | G06F 13/385 703/23 |
| 8,879,570 B2* | 11/2014 | Nagapudi | ............... | H04L 12/12 370/420 |
| 9,444,680 B2 | 9/2016 | Agrawal et al. | | |
| 10,592,447 B1 | 3/2020 | Danilov et al. | | |
| 10,873,496 B1* | 12/2020 | Winter | ................ | H04L 43/0811 |
| 2005/0160207 A1* | 7/2005 | Chen | ..................... | G06F 13/409 710/301 |

(Continued)

FOREIGN PATENT DOCUMENTS

EP    3771180    1/2021

OTHER PUBLICATIONS

Raghu, Priya, et al.; "Datacenter Secure Control Module Specification"; Open Compute Project; http://opencompute.org; Mar. 11, 2021; 50 pp.

*Primary Examiner* — Danny Chan
(74) *Attorney, Agent, or Firm* — Trop, Pruner & Hu, P.C.

(57) ABSTRACT

A process includes an application layer of a host of a computer platform using a smart network interface card (NIC) of the computer platform to provide an input/output (I/O) service for the application layer. The I/O service includes a service that is associated with a cloud operator domain; the smart NIC is installed in a connector; and the application layers associated with a cloud tenant domain. The process includes a baseboard management controller of the smart NIC managing the computer platform. Managing the computer platform includes the baseboard management controller managing the host; the baseboard management controller managing components of the smart NIC other than the baseboard management controller; and managing the host includes the baseboard management controller communicating with the host via the connector to control a system power state of the computer platform.

23 Claims, 10 Drawing Sheets

(56) References Cited

U.S. PATENT DOCUMENTS

| | | | |
|---|---|---|---|
| 2009/0100194 A1* | 4/2009 | Bhadri | G06F 15/173 |
| | | | 710/305 |
| 2011/0093690 A1* | 4/2011 | Vyssotski | G06F 9/4406 |
| | | | 714/E11.023 |
| 2014/0280837 A1* | 9/2014 | Ayanam | H04L 43/0817 |
| | | | 709/223 |
| 2014/0289436 A1* | 9/2014 | Lewis | G06F 13/24 |
| | | | 710/260 |
| 2016/0062433 A1* | 3/2016 | York | G06F 1/266 |
| | | | 713/310 |
| 2016/0080210 A1* | 3/2016 | Lai | G06F 13/20 |
| | | | 709/224 |
| 2018/0367870 A1* | 12/2018 | Shih | H05K 7/1498 |
| 2019/0045037 A1* | 2/2019 | Sukhomlinov | H04L 12/4633 |
| 2019/0220601 A1 | 7/2019 | Sood et al. | |
| 2019/0303335 A1* | 10/2019 | Remis | G06F 13/4068 |
| 2020/0110626 A1 | 4/2020 | Kochevar-Cureton et al. | |
| 2020/0127981 A1 | 4/2020 | Yang et al. | |
| 2020/0136901 A1 | 4/2020 | Ballard et al. | |
| 2020/0203898 A1 | 6/2020 | Butcher et al. | |
| 2020/0259799 A1 | 8/2020 | Li et al. | |
| 2020/0278893 A1 | 9/2020 | Niell et al. | |
| 2021/0226846 A1* | 7/2021 | Ballard | H04L 41/0843 |
| 2022/0103490 A1* | 3/2022 | Kim | H04L 49/253 |
| 2022/0247830 A1* | 8/2022 | Paulraj | H04L 67/125 |
| 2022/0283979 A1* | 9/2022 | Lin | G06F 13/4282 |
| 2023/0029074 A1* | 1/2023 | Chawla | G06F 3/0619 |

* cited by examiner

US 11,927,999 B2

SERVER NETWORK INTERFACE CARD-LOCATED BASEBOARD MANAGEMENT CONTROLLERS

BACKGROUND

For purposes of communicating with an external network, a computer platform may have a network interface card (NIC) (e.g., a Peripheral Component Interconnect express (PCIe) bus card), which provides network connectivity for components of the platform. Computer technology is ever-evolving, and more recent computer platforms may have "smart NICs." In addition to providing network connectivity, a smart NIC may offload processing operations that were traditionally performed by general purpose central processing units (CPUs) of legacy computer platforms.

DETAILED DESCRIPTION

Figure 1A:
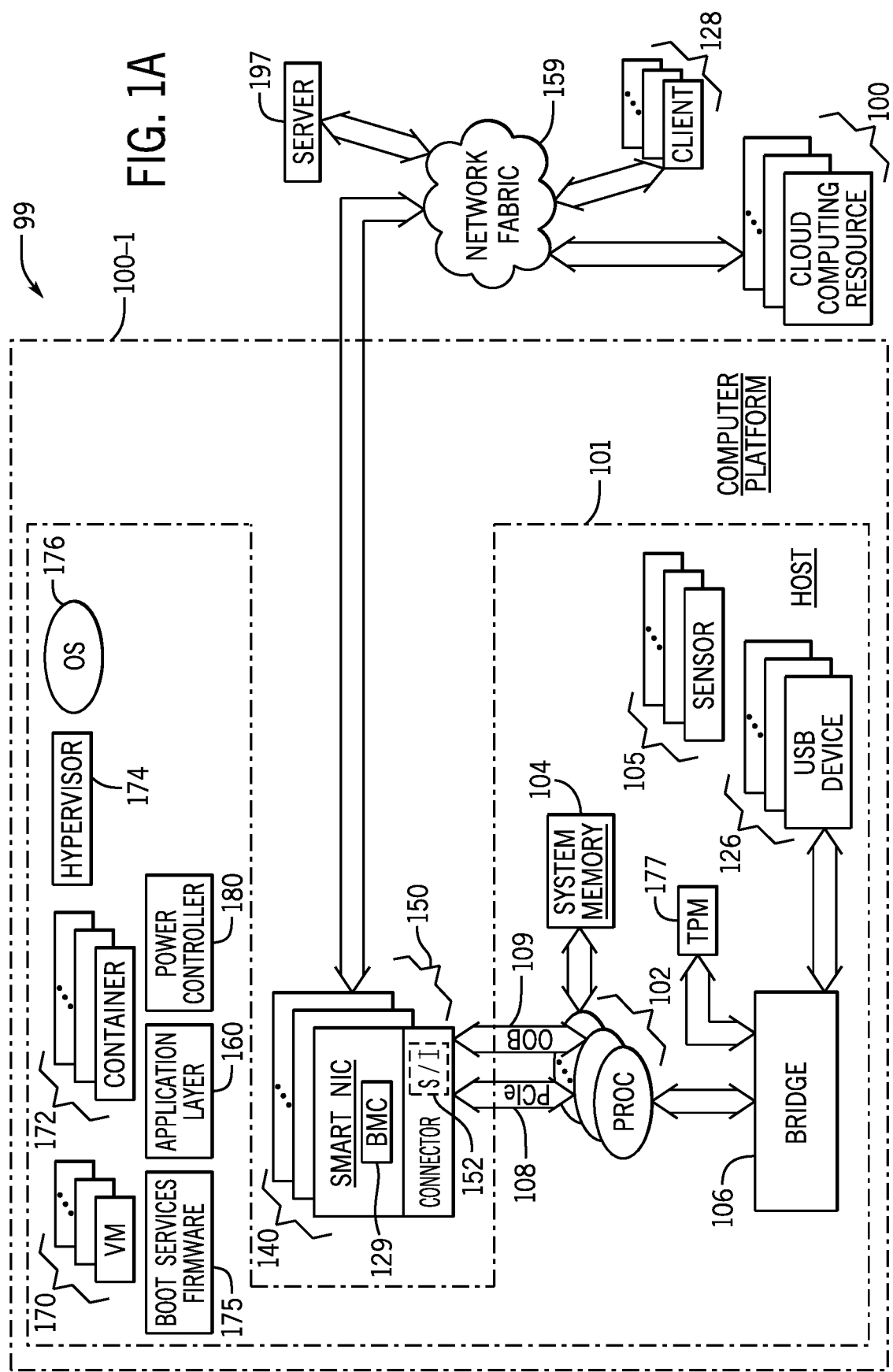
FIG. 1A is a schematic diagram of a cloud-based computer system according to an example implementation.

The information technology (IT) industry is ever-increasingly becoming cloud-centric, and server architectures are transforming accordingly to address the challenges that arise in providing cloud services. A multi-tenant cloud operator that provides cloud services for a large number of clients, or tenants, may rely on networked servers (e.g., blade servers) that may be located in one or multiple data centers. A given server may execute cloud native software for multiple tenants; and as such, certain resources of the server may be considered to reside in an untrusted cloud tenant domain (or "client domain"), as the domain is shared by more than one tenant. The execution of the tenant software may rely on input/output (I/O) services that are provided by the cloud operator, and these I/O services may be, through security restrictions that are enforced by the server, in a trusted, cloud operator domain that is separate from the client domain.

More specifically, a set of resources of a given server may be considered to be part of a "host." In general, the host has traditionally been considered the main control point for the server and includes the server's general purpose processing hardware (e.g., general purpose central processing units (CPUs)), memory and so forth) and software, which execute software instances (application instances, operating system instances, and so forth) for the tenants and provide virtualization-based tenant isolation (e.g., virtual machines, and containers) for the software instances. As such, at least a portion of the host may be considered to be part of the client domain.

The I/O services that are provided by the cloud operator may include networking services, such as network virtualization services (e.g., overlay network services, virtual switching services, virtual routing services and network function virtualization services); network storage services; networking monitoring services; and so forth. The I/O services may also include storage acceleration services (e.g., non-volatile memory express (NVMe)-based services) and security services (e.g., cryptography services and network firewall services).

To address the ever-increasing cloud-centric nature of server processing, a cloud native server architecture may offload processing operations that have traditionally been performed by main CPU processing operations in legacy server architectures to one or multiple peripherals of the server. In this context, a "peripheral" refers to a component of the server, which provides one or multiple services or functions for the server's host; and in particular, in accordance with example implementations, the peripheral may be a smart NIC that provides one or multiple I/O services for tenant application instances that are being executed on the server.

In this context, a "smart NIC" generally refers to a NIC that, in addition to establishing network connectivity for the server, provides one or multiple I/O services that are affiliated with the cloud operator (and cloud operator domain). Here, "I/O service" refers to a service that includes the use of one or more network resources (e.g., resources accessible via an external network to the server) and provides a function other than and in addition to providing network connectivity for components of the server. As described above, the I/O service may be any of the services mentioned above, such as a networking service, a storage service or a security service.

Unlike legacy server architectures in which the host serves as the main control point for all server-related operations, as part of a cloud native server architecture, the smart NIC may serve as the control point for the server. The smart NIC may enforce a boundary, or isolation, between the client and cloud operator domains by providing two double air-gapped security management and control interfaces on the server: a first air-gapped security management and control interface related for transactions (e.g., communications, requests, responses and so forth) that are transmitted from the tenant domain to the cloud operator domain; and a second air-gapped security management and control interface for transactions that transmitted from the cloud operator domain to the tenant domain. In this context, an "air-gapped interface" (such as the first air-gapped security management or the second air-gapped security management and control interface) refers to a communication interface that is isolated by software and/or hardware from an unsecure network. The air-gapped interface may or may not correspond to an actual physical isolation (e.g., the air-gapped interface may or may not include the presence of an actual air gap in the communication path), depending on the particular implementation.

The server may include a specialized service processor, called a "baseboard management controller," or "BMC," which, in general, may be remotely accessed (e.g., accessed from a remote server located at a different geographical location than the server, such as a remote server located outside of the data center containing the server). In general, the BMC serves as an agent that, responsive to communications from a remote management server, may manage operations and functions of the server. This management, in general, is independent from the host, and the BMC may be able to manage the host, even if software has not been installed on the host; and, in accordance with example implementations, due to a power supply that provides power to the BMC independently from the host, the BMC may perform management functions when the host is powered down. In this context, "managing the host" refers to the BMC performing one or multiple actions pertaining to monitoring, maintaining, configuring or controlling the host. As examples of its roles in managing the host, the BMC may power up the host; power down the host; monitor sensors (e.g., temperature sensors, cooling fan speed sensors); monitor operating system statuses; monitor power statuses; log computer system events; control boot paths; control the use of virtual media; control security checks; update firmware; validate software; validate hardware; enable boot functionality of the host; and so forth. Moreover, the BMC may manage operations for the host before the host is powered on; manage operations before the operating system of the host has booted; and perform recovery operations after an operating system or computer system failure.

Although legacy servers may include a single BMC for purposes of managing the host, servers that have cloud native architectures may have multiple BMCs (e.g., one BMC for the host and a BMC for each smart NIC of the server). In this manner, the smart NIC may contain a BMC for purposes of managing operations and functions on the smart NIC, such as powering the smart NIC on, configuring the smart NIC, booting the smart NIC, controlling a health of the smart NIC, updating firmware of the smart NIC, and so forth. However, challenges may arise in the use of multiple BMCs on the server, such as one BMC for the host and another BMC for a smart NIC. For example, the host BMC may be responsible for the overall management of the server. This means that management actions for the host and smart NIC may entail the smart NIC's BMC coordinating its management actions with the host BMC, and possibly vice-versa. As examples, this coordination may involve the smart NIC BMC communicating with the host BMC for purposes of managing power up and/or power down operations of the host, smart NIC and/or server. As other examples of the coordination between BMCs, the smart NIC BMC may communicate with the host BMC for such purposes as determining whether the host is powered up; determining whether the host has passed fault checks associated with the host's power up; determining whether the host has passed security checks associated with the host's power up; the smart NIC BMC informing the smart NIC BMC that the server is powering down; and so forth. As another example of the coordination between the BMCs, the host BMC and smart NIC BMC may communicate regarding compatibility or timing of firmware upgrades. As yet another example, the host BMC and smart NIC BMC may communicate regarding a thermal issue on the smart NIC so that the host BMC may adjust a cooling fan speed. Therefore, in general, the two BMCs may coordinate with each regarding a number of management issues pertaining to the host, the smart NIC, and the overall server platform. This coordination between two BMCs may contribute to the overall complexity and costs of the server.

In accordance with example implementations that are described herein, a computer platform (e.g., a server, a blade server, and so forth) includes a host and a smart NIC that is installed in an expansion bus connector (e.g., a PCIe bus connector) of the computer platform. Instead of the host and the smart NIC each containing a BMC, in accordance with example implementations, a single BMC is located on the smart NIC; and this single BMC manages both the smart NIC and the host. In other words, in accordance with example implementations, the smart NIC-located BMC manages operations (e.g., powering on, configuration, booting, platform health control, firmware updates, and so forth) of the host and manages operations (e.g., powering on, configuration, booting, platform health control, firmware updates, and so forth) of the smart NIC. Among the possible advantages of such an arrangement, the costs and complexity of the server are reduced, as the overhead that is otherwise associated with the coordination and collaboration between multiple BMCs is eliminated.

Referring to FIG. 1A, as a more specific example, in accordance with some implementations, a cloud-based computer system 99 that is affiliated with a particular cloud operator may provide multi-tenant cloud services for multiple clients, or tenants. The cloud services may be any of a number of different cloud services, such as Software as a Service (SaaS), Infrastructure as a Service (IaaS), Platform as a Service (PaaS), and so forth. Moreover, depending on the particular implementation, the cloud services may be affiliated with one of several different cloud infrastructures, such as a public cloud that is generally available to all potential users over a public network; a limited access private cloud that is provided over a private network (e.g., cloud services provided by an on-site data center); or a hybrid cloud that is a combination of public and private clouds.

The tenants may access cloud computing resources 100 (that provide the cloud services) of the system 99 via cloud clients 128 (e.g., laptops, desktop computers, smartphones, tablet computers, wearable computers, and so forth). As depicted in FIG. 1A, the cloud computing resources 100 and clients 128 may be interconnected by network fabric 159. In general, the network fabric 159 may be associated with one or multiple types of communication networks, such as (as examples) Fibre Channel networks, Gen-Z fabrics, dedicated management networks, local area networks (LANs), wide area networks (WANs), global networks (e.g., the Internet), wireless networks, or any combination thereof.

In general, the cloud computing resources 100 are a shared pool of resources, including physical hardware resources, such as physical servers (e.g., server blades), networking components, administrative resources, physical storage devices, physical storage networks, and so forth. FIG. 1A illustrates a physical computer platform 100-1, which may provide at least part of the cloud computing resources 100. In this context, a "computer platform" refers to a unit including a chassis and hardware that is mounted to the chassis, where the hardware is capable of executing machine-executable instructions (or "software"). A blade server is an example of the computer platform 100-1, in accordance with an example implementation. The computer platform 100-1 may, however, be a platform other than a blade server, in accordance with further implementations, such as a rack-mounted server, a client, a desktop, a smartphone, a laptop computer, a tablet computer, and so forth.

For example implementations in which the computer platform 100-1 is a blade server, the server may have a frame, or chassis; one or multiple motherboards may be mounted to the chassis; and each motherboard may contain one or multiple multicore central processing unit (CPU) semiconductor packages (or "sockets" or "chips"). In accordance with example implementations, the blade server may have a form factor, mechanical latch(es) and corresponding electrical connectors for purposes of allowing the server blade to be installed in and removed from a corresponding server blade opening, or slot, in rack-mounted blade enclosure.

Regardless of its particular form, in accordance with example implementations, the computer platform 100-1 may have a cloud native architecture in which hardware resources and machine-executable instruction resources (i.e., "software resources") of the computer platform 100-1 are divided into two security domains: a cloud tenant domain; and a cloud operator domain. In this context, the "tenant domain" refers to the part of the computer platform 100-1 that is associated with executing the tenant software and data; and in accordance with example implementations, the cloud operator (the entity providing the cloud services) cannot access or at least has limited access to the tenant data and software. The "cloud operator domain" refers to the part of the computer platform 100-1 that is associated with providing I/O services for the executing tenant software.

More specifically, in accordance with some implementations, the computer platform 100-1 includes a host 101 that is associated with the client domain. The host 101 includes an application layer 160, which contains application instances that may be associated with one or multiple tenants at any particular time. Virtualization technology may be employed on the computer platform 100-1 for purposes of providing security and fault isolation among the tenants. For example, application instances for a particular tenant may be executed inside one or multiple virtual machines (VMs) 170, and these VM(s) 170, in turn, may reside inside a given container 172 that is associated with the tenant. In this manner, in accordance with some implementations, a given tenant may be associated with one or multiple VMs 170 and one or multiple containers 172.

In this context, a "virtual machine," or "VM" (also called a "guest virtual machine," a "virtual machine instance," or "a guest virtual machine instance") refers to a virtual environment that functions as a virtual server, or virtual computer system, which has its own physical resources (e.g., CPU(s), system memory, network interface(s) and storage). Moreover, the VM may have its own abstraction of an operating system, such as operating system 176; and in general, the VM is a virtual abstraction of hardware and software resources of the computer platform 100-1. The lifecycle (e.g., the deployment and termination) of the VM may be managed by a virtual machine monitor (VMM), or hypervisor, such as hypervisor 174.

A "container" (also called an "instantiated container," "container instance," or "software container"), as used herein, generally refers to a virtual run-time environment for one or multiple applications and/or application modules, and this virtual run-time environment is constructed to interface to an operating system kernel. A container for a given application may, for example, contain the executable code for the application and its dependencies, such as system tools, libraries, configuration files, executables and binaries for the application. In accordance with example implementations, the container contains an operating system kernel mount interface but does not include the operating system kernel. As such, a given computer platform may, for example, contain multiple containers that share an operating system kernel through respective operating system kernel mount interfaces. Docker containers and rkt containers are examples of software containers.

In accordance with example implementations, the host 101 includes a bus infrastructure, which includes one or multiple expansion bus connectors 150 (e.g., Peripheral Component Interconnect express (PCIe) bus connectors). A given expansion bus connector 150 may receive a smart NIC 140. Moreover, in accordance with example implementations, the smart NIC 140 provides double air-gapped security management and control interfaces to create boundaries of the tenant and cloud operator domains. As depicted in FIG. 1A, in accordance with example implementations, a specific smart NIC 140 includes a BMC 129; and in accordance with example implementations, this single BMC 129 manages operations of the entire computer platform 100-1, i.e., the BMC 129 manages the host 101, and the BMC 129 also manages the smart NIC 140.

As used herein, a "BMC," or "baseboard management controller," is a specialized service processor that monitors the physical state of a server or other hardware using sensors and communicates with a management system through a management network. The baseboard management controller may also communicate with applications executing at the operating system level through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. The baseboard management controller may be located on the motherboard or main circuit board of the server or other device to be monitored. The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

The BMC 129 may be remotely accessed by a remote management server 197 that is coupled to the network fabric 159. In this manner, the remote server 197 may communicate requests (e.g., Intelligent Platform Management Interface (IPMI) messages containing IPMI commands) to the BMC 129 for the BMC 129 to manage and control functions of the host 101 and smart NIC 140; and the remote server 197 may receive messages (e.g., IPMI messages) from the BMC 129 representing status information, health information, configuration information, configuration options, event notifications, and so forth) from the BMC 129.

In accordance with example implementations, the smart NIC-located BMC 129 manages the host 101 using communications that occur through a signaling interface 152 of the connector 150 via one or multiple out-of-band communication channels 109. In this context, the signaling interface 152 of the connector 150 refers to physical communication terminals (e.g., pins, sockets, or terminals) of the connector 150. An "out-of-band communication channel" with the smart NIC 140, in this context, refers to the use of a secure communication channel with the smart NIC 140 other than the smart NIC's primary communication channel. For example, in accordance with some implementations, the smart NIC 140 may be a PCIe card, which has a primary PCIe bus communication channel; and for these implementations, the out-of-band communication channel 109 may be, for example, an inter-integrated bus ($I^2C$) bus, an improved inter-integrated ($I^3C$) bus, a Serial Peripheral Interface (SPI) bus, an enhanced SPI (eSPI) bus, or a bus that is associated with another standard. The signaling interface 152 may include, in accordance with example implementations, communication channels that are associated with the communication of control and/or telemetry signals to/from the BMC 129. Depending on the particular implementation, the signaling interface 152 may correspond to all of the terminals of the connector 150 or may correspond to a lesser subset of all of the terminals of the connector 150.

The smart NIC 140 may, in accordance with example implementations, be disposed on a circuit card substrate that has a card edge connector that is constructed to be inserted into the connector 150 to mechanically secure the smart NIC 140 to the connector 150 and form electrical connections between the host and the smart NIC 140. For example, in accordance with some implementations, the connector 150 is a slot connector; and a circuit card substrate of the smart NIC 140 may have electrically conductive traces that disposed on a card edge that has a form factor that is constructed to be received inside the connector 150 so that when the card edge is received in the connector, the traces contact and are electrically connected to terminals (e.g., spring terminals) of the connector 150.

In accordance with example implementations, the connector 150 may have a card edge pinout that corresponds to the Datacenter-ready Secure Control Interface (DC-SCI) of the Datacenter-Secure Control Module (DC-SCM) Specification, which is published by the Open Compute Project, Version 1.0 (Mar. 11, 2021).

Figure 2:
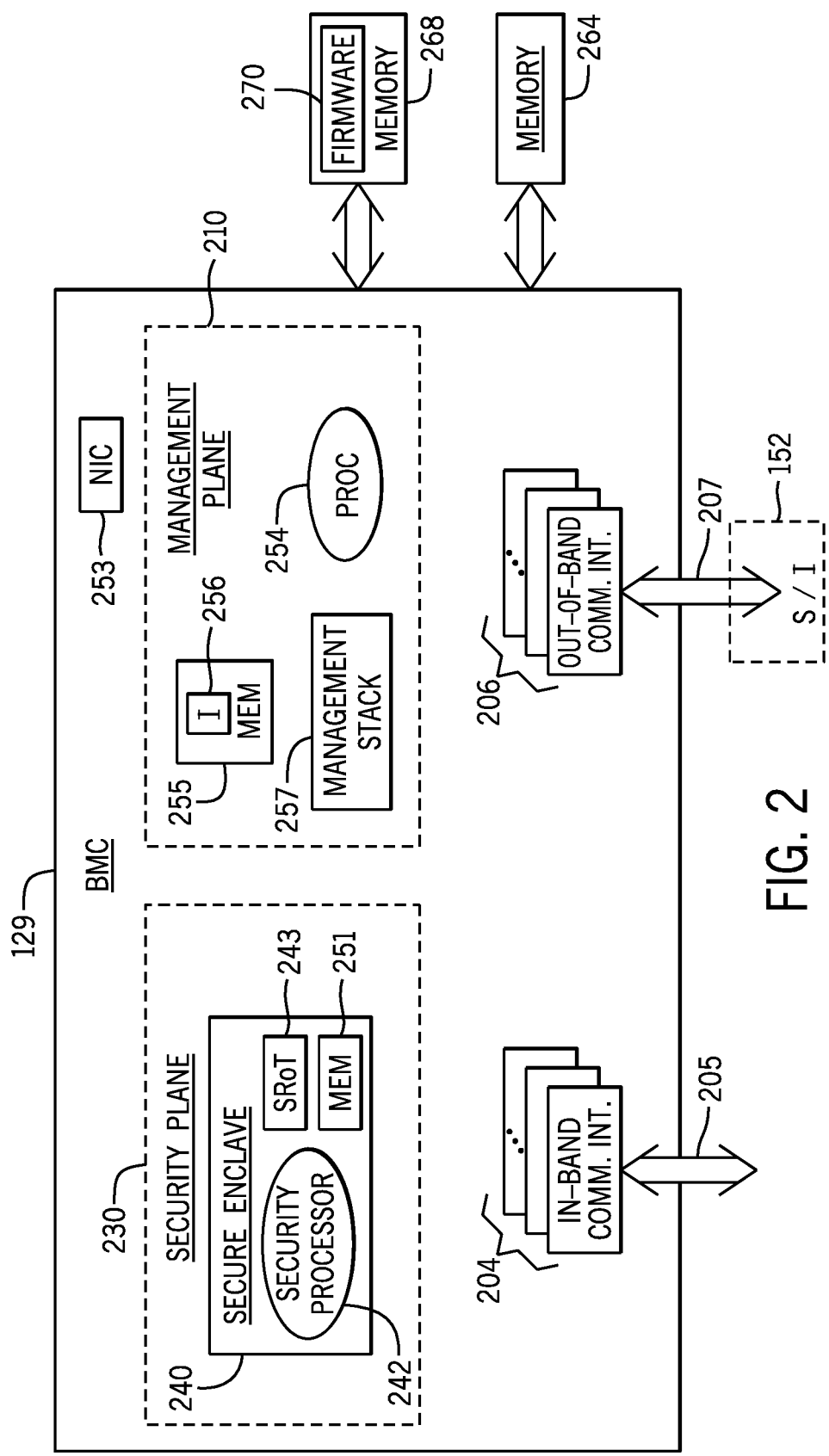
FIG. 2 is a schematic diagram of a hardware BMC of the smart NIC according to an example implementation.

As further described herein, in accordance with some implementations, the BMC 129 may include dedicated hardware, which performs solely BMC-related management operations and is not shared with other components of the smart NIC 140 for non-management-related BMC operations. For example, in accordance with some implementations, the BMC 129 may contain a main semiconductor package (or "chip"), which contains one or multiple semiconductor die. More specifically, in accordance with some implementations, the BMC 129 may include a main semiconductor package that includes one or multiple main hardware processing cores (e.g., CPU cores, Advanced Reduced Instruction Set Computer (RISC) Machine (ARM) processing cores, and so forth), which execute machine-executable instructions (or "software," such as firmware) for purposes of managing operations of the host 101 and the smart NIC 140. FIG. 2 (described further herein) is a schematic diagram of such a dedicated hardware-based BMC in accordance with example implementations.

Figure 1B:
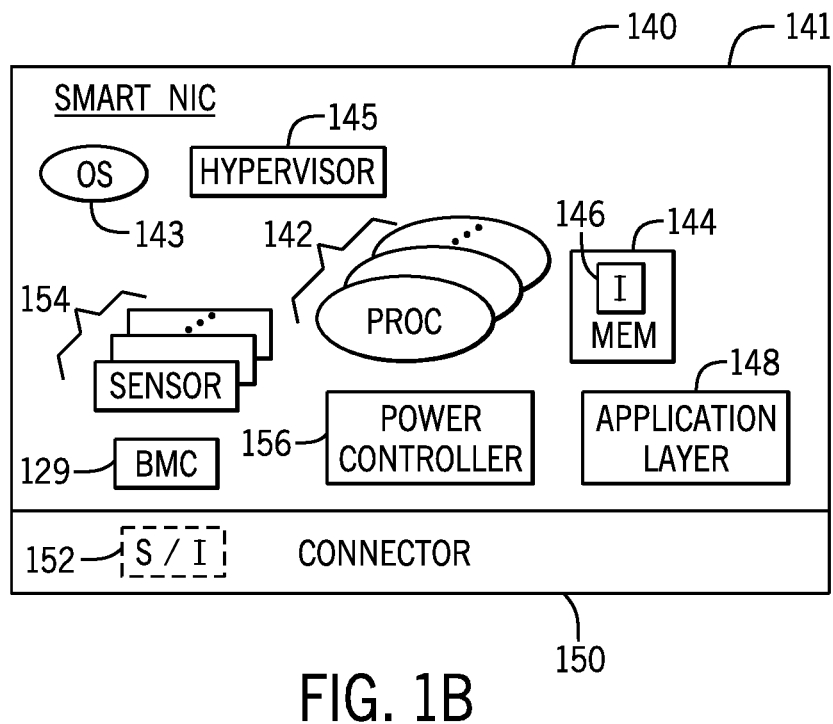
FIG. 1B is a schematic diagram of a smart network interface card (NIC) that is installed in a computer platform of the computer system of FIG. 1A, and which includes a baseboard management controller (BMC) to manage the computer platform according to an example implementation.
Figure 1C:
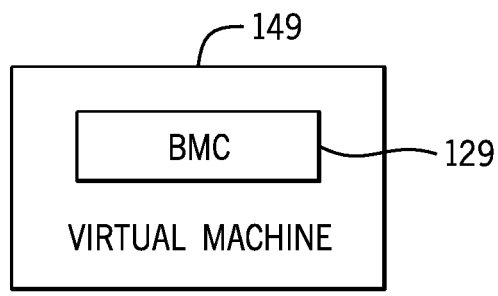
FIG. 1C is an illustration of a virtual BMC of the smart NIC according to an example implementation.

Referring to FIG. 1C in conjunction with FIG. 1A, in accordance with further example implementations, the BMC 129 may be a virtual BMC, i.e., an abstraction of actual hardware and software of the smart NIC 140. For example, in accordance with some implementations, the smart NIC 140 may provide one or multiple guest VMs 149, which provides the BMC 129. The guest VM(s) 149 may, for example, executed inside a virtualized environment, such as a container. In accordance with some implementations, the smart NIC 140 may contain, as further described herein, hardware processors (e.g., CPUs, CPU processing cores, ARM processing cores, and so forth), which execute machine-executable instructions for purposes of providing one or multiple I/O services for the smart NIC 140. In accordance with example implementations, one or multiple of these hardware processor(s) of the smart NIC 140 may further execute instructions to provide the VM machine 149 and BMC 129.

As a more specific example, in accordance with some implementations, hardware processors of the smart NIC 140 may execute machine-executable instructions to provide a container that contains a virtual machine 149 that is associated with a management plane of the BMC 129 and contains one or multiple application instances that correspond to the BMC's management stack for purposes of managing the computer platform 100-1; and the container may contain another virtual machine 149 that is associated with a security plane of the BMC 129 and contains one or multiple application instances that provide security services for the computer platform 100-1. A security plane 230 and a management plane 210 of a hardware BMC 129 are discussed below in connection with FIG. 2.

In accordance with further example implementations, the BMC 129 may be a hybrid combination of a virtual BMC and a hardware BMC. For example, the hybrid BMC 129 may contain dedicated hardware components to provide certain management and/or security plane functions of the hybrid BMC 129; and hardware processors of the smart NIC 140, which execute machine-executable instructions to provide I/O services for the smart NIC 140 may further execute machine-executable instructions to provide management and/or security plane functions of the hybrid BMC 129.

Referring back to FIG. 1A, for the example implementation that is depicted in FIG. 1A, the host 101 may include one or multiple general purpose hardware processors 102 (e.g., one or multiple CPU packages, one or multiple CPU processing cores, one or multiple GPU cores, one or multiple FPGAs, and so forth); a system memory 104; and a bus infrastructure. In accordance with example implementations, the general purpose hardware processor(s) 102 execute machine —executable instructions (i.e., "software") for the host 101. For example, the hardware processor(s) 102 may execute instructions associated with instances of the VMs 170, instances of the containers 172, a hypervisor 174, the operating system 176, application instances associated with the application layer 160, boot services firmware 175, and so forth. In accordance with example implementations, the system memory 104 and other memories that are discussed herein are non-transitory storage media that may be formed, in general, from storage devices, such as semiconductor storage devices, memristor-based storage devices, magnetic storage devices, phase change memory devices, a combination of devices of one or more of these storage technologies, and so forth. The system memory 104 may represent a collection of both volatile memory devices and non-volatile memory devices. The boot services firmware 175 represents firmware (e.g., basic input/output operating system (BIOS) firmware and/or Unified Extensible Firmware Interface (UEFI) firmware) that is executed by the computer platform 100-1 during the boot of the computer platform 100-1 after a power on or reset of the computer platform 100-1.

In accordance with example implementations, the bus infrastructure of the host 101 may include one or multiple bridges 106 that may be coupled to the system memory 104, and other components of the host 101, such as a Trusted Platform Module (TPM) 177; one or multiple USB devices 126; and so forth. The bridge(s) 106 may include one or multiple PCIe ports that are connected, via one or multiple corresponding PCIe links, or buses 108, to one or multiple PCIe bus expansion cards 150, such as the depicted connector 150 that receives a smart NIC 140. In general, the bridge(s) 106 may include interfaces to various buses of the host 101, such as a PCIe bus, an SPI bus, an enhanced SPI (eSPI) bus, a Low Pin Count (LPC) bus, an $I^2C$ bus, an $I^3C$ bus, as well as possibly buses associated with other bus standards.

In accordance with some implementations, the bridges 106 may include a north bridge 106 and a separate south bridge 106. In this manner, in accordance with some implementations, the general purpose hardware processor 102 may include one or multiple semiconductor packages (or "chips"), and the processor 102 may include the north bridge 106 that includes a memory controller and PCIe root ports. The south bridge 106 that may provide I/O ports, such as, for example, Serial Advanced Technology Attachment (SATA) ports, Universal Serial Bus (USB) ports, LPC ports, SPI ports, eSPI ports and so forth. In accordance with some implementations, the north bridge 106 may not be part of the hardware processor 102. In accordance with further implementations, the north and south bridges may be combined into a single bridge 106; and in accordance with some implementations, this single bridge 106 may be part of the processor 102.

Among its other hardware components, in accordance with example implementations, the host 101 may include a power controller 180, which may be controlled through the operating system 176 for purposes of setting a particular system power state for the computer platform 100-1. In this manner, in accordance with example implementations, the operating system 176 may communicate with the power controller 180 (e.g., cause the assertion of one or multiple signals to the power controller 180) for purposes of changing the system power state. In this context, the "system power state" refers to the power state of all components of the computer platform 100-1, except for components of the computer platform 100-1 that are involved in the platform's management, such as the BMC 129. For a given system power state, some components of the computer platform 100-1 may be powered up at different levels than other components (e.g., some components of the computer platform 100-1 may be powered down for a given power consumption state for purposes of conserving power, whereas other components may be powered up to a relatively higher power consumption state). For example, the operating system 176 may communicate with the power controller 180 for purposes of transitioning the computer platform 100-1 to a power on reset; transitioning the computer platform 100-1 from a higher power consumption state to a lower power consumption state; transitioning the computer platform 100-1 from a lower power consumption state to a higher power consumption state; powering down the computer platform 100-1; and so forth.

In accordance with example implementations, the power controller 180 may be controlled by an entity other than the operating system 176. For example, in accordance with some implementations, the boot services firmware 175 may communicate with the power controller 180 for purposes of controlling the system power state. Moreover, as further described herein, in accordance with some implementations, the BMC 129 may communicate with the appropriate entity (e.g., the power controller 180, the boot services firmware 175 or operating system 176) for purposes of changing the system power state.

As also depicted in FIG. 1A, in accordance with some implementations, the computer platform 100-1 may include one or multiple sensors 105. In accordance with example implementations, the sensors 105 provide signals, or indications, which represent various sensed conditions relating to the environment and/or health of the computer platform 100-1. In this manner, in accordance with example implementations, the BMC 129 may monitor signals provided by sensors 105 for such purposes as monitoring the health of the computer platform 100-1; monitoring temperatures of the computer platform 100-1 for purposes of performing thermal management; monitoring for tamper detection; and so forth. As examples, the sensors 105 may be temperature sensors; tamper indication sensors; overvoltage sensors; undervoltage sensors; fan speed sensors; and so forth. The signals that are provided by the sensors 105 are routed to the BMC 129 via the signaling interface 152.

Referring to FIG. 1B, in accordance with example implementations, the smart NIC 140 may include one or multiple hardware components that are mounted to one or multiple circuit substrates 141. Moreover, a given circuit substrate 141 may have a form factor and corresponding features (electrical traces, and so forth), which allows the smart NIC 140 to be installed in the connector 150. In accordance with some implementations, the circuit substrate 141 may have a card edge that has conductive traces that are arranged in a pinout in accordance with the DC-SCI, and in accordance with further implementations, the circuit substrate 141 may have a card edge that has conductive traces that are arranged in a pinout other than, or in addition to, the DC-SCI. In accordance with example implementations, the smart NIC 140 includes hardware components, such as one or multiple hardware processors 142 (e.g., CPU processing cores, such as ARM processing cores, embedded processing cores, ARM processing cores, and so forth); a memory 144; one or multiple sensors 154; a network interface (not shown); and a power controller 156.

The processor(s) 142 execute machine-executable instructions 146 that are stored in the memory 144. In accordance with some implementations, the processor(s) 142 execute the instructions 146 for purposes of performing one or multiple cloud operator domain-based I/O services for the host 101. In this manner, in accordance with example implementations, the processor(s) 142 may execute the instructions 146 for purposes of performing one or multiple application instances of an application layer 148, as well as instances associated with virtual machines, containers, and so forth.

The sensors 154 sense conditions (e.g., environmental, fault and/or tamper events) of the smart NIC 140, and the indications, or signals, that are provided by the sensors 154 may be monitored by the BMC 129.

As noted herein, in accordance with some implementations, the BMC 129 may be formed from discrete hardware components separate from other components of the smart NIC 140, such as a standalone semiconductor package and possibly associated memory, Application Specific Integrated Circuits (ASICs), and so forth. Moreover, in accordance with further example implementations, the BMC 129 may be a virtual BMC, which is formed by one or multiple processors 142 of the smart NIC 140 executing machine-executable instructions; or in accordance with yet further implementations, the BMC 129 may be a hybrid BMC that contains virtual and actual hardware components.

FIG. 2 depicts a hardware BMC 129 that is formed from actual, hardware components, in accordance with example implementations. Referring to FIG. 2 in conjunction with FIGS. 1A, 1B, and 1C, the BMC 129 contains a management plane 210 and a security plane 230 that is isolated from the management plane 210. In accordance with example implementations, the security plane 230 includes a secure enclave 240, which refers to the part of the BMC 129, which provides security services for the computer platform 100-1. In this context, "a secure enclave" refers to a subsystem, for which access into and out of the subsystem is tightly controlled. The management plane 210 is the part of the BMC 129 that executes a management firmware stack 257 (herein called a "management stack 257") for purposes of providing management services for the computer platform 100-1, including managing the host 101 and managing the smart NIC 140, in accordance with example implementations. As an example, the management stack 257 may be an Open BMC firmware stack, version 2.9.0, released on Jan. 12, 2021. The management stack 257 may be a management stack other than an Open BMC stack and other than an open source stack, in accordance with further implementations.

As depicted in FIG. 2, in accordance with example implementations, the BMC 129 may be coupled to one or multiple external memories (e.g., external to a semiconductor package containing the BMC 129), such as a volatile memory 264 and a non-volatile memory 268. As an example, the non-volatile memory 268 may store firmware 270 (e.g., a firmware image), and may be connected to the BMC 129 via a bus (e.g., an SPI bus). As further described herein, in accordance with some implementations, the BMC 129 may validate the firmware 270 upon boot of the computer platform 100-1.

In accordance with example implementations, among its other features, the secure enclave 240 includes a security processor 242 (e.g., an embedded CPU processing core); a volatile memory 251 (e.g., a memory to store firmware that is loaded into the volatile memory and executed by the security processor); a secure bridge to control access into the secure enclave and control outgoing communications from the secure enclave; peripherals (e.g., cryptographic accelerators, a random number generator, a tamper detection circuit, and so forth); and a hardware Root of trust (RoT) engine 243 (called a silicon RoT engine, or "SRoT engine 243" herein). In accordance with example implementations, the SRoT engine 243 validates firmware to be executed by the security processor 242 before the SRoT engine 243 loads the firmware into the secure enclave's volatile memory 251 and allows the security processor 242 to execute the firmware.

As used herein, a "Root of Trust device," such as the SRoT engine 243, may be a device that behaves in an expected manner. In other words, the SRoT device 243 may be inherently trusted software, hardware, or some combination thereof. The SRoT device 243 may include compute engines. The compute engine may be software operating using hardware in the SRoT device 243, hardware of the SRoT device 243, or some combination thereof. A SRoT device 243 may include a Root of Trust for Verification (RTV). The RTV performs an integrity measurement or digital signature of program code (e.g., the code loaded into the secure enclave) and validates the code against a predetermined expected value or policy. The SRoT device 243 may include a Root of Trust for Storage (RTS). The RTS may be a compute engine capable of maintaining an accurate summary of tamper evident values. For example, the SRoT device 243 may include a register that stores a reference hash or a measurement hash. Further, the SRoT device 243 may include a plurality of such registers. In another example, the SRoT device 243 may include a Root of Trust for Reporting (RTR). The RTR may be a compute engine capable of sending requested information to a requesting device. The information may include the contents in a register of the SRoT device 243 (or the contents of the RTS) and information specified by the requester. The SRoT device 243 may include other compute engines not described here, such as a compute engine to measure specified values or a compute engine to authenticate.

As depicted in FIG. 2, in accordance with some implementations, the BMC 129 includes one or multiple in-band communication interfaces 205 (e.g., a PCIe bus interface) and one or multiple out-of-band communication interfaces 206 (e.g., an DC-SCI). Moreover, the BMC 129 includes one or multiple embedded hardware processing cores 254 (e.g., an embedded CPU processing core, such as an ARM processing core), which execute machine-executable instructions 256 that are stored in a non-volatile memory 255 of the BMC 129 for purposes of providing the BMC's management stack 257. As depicted in FIG. 2, in accordance with some implementations, the signaling interface 152 may contain signals that are communicated with out-of-band communication interface(s) 206. In accordance with further implementations, the signaling interface 152 may also include signals associated the in-band communication interface(s) 204.

Figure 3:
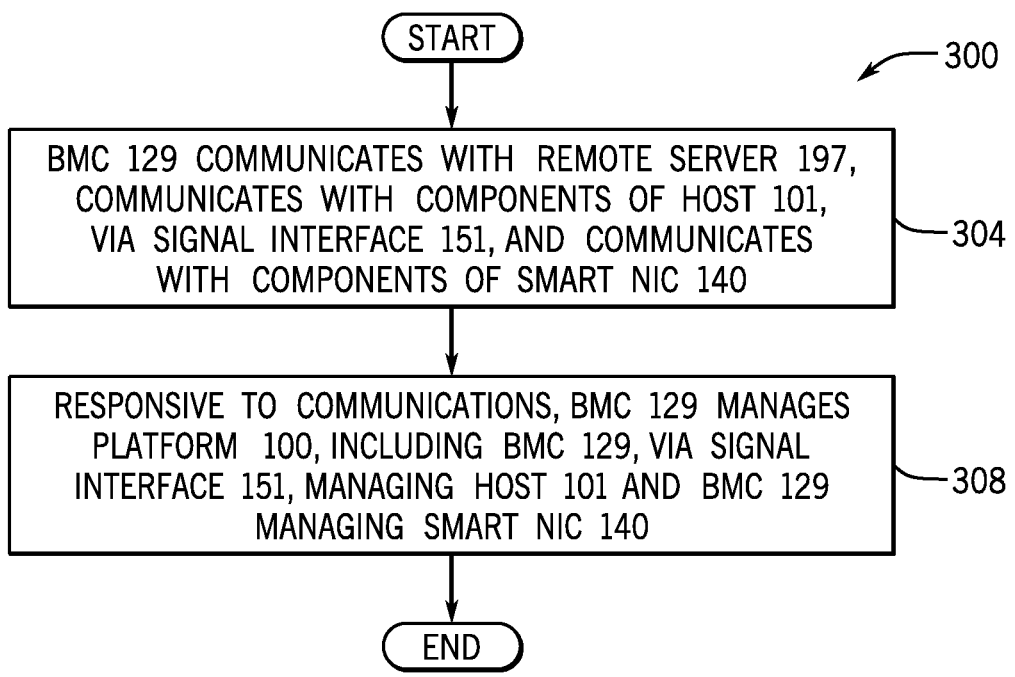
FIG. 3 is a flow diagram depicting a process of a smart NIC-located BMC to manage a computer platform according to an example implementation.

FIG. 3 depicts an example management plane process 300 of the BMC 129, in accordance with some implementations. Referring to FIG. 3 in conjunction with FIGS. 1A and 2, in accordance with some implementations, the process 300 includes the BMC 129 communicating (block 304) with the remote server 197; the BMC 129 communicating with components of the host 101, via the signal interface 151; and the BMC 129 communicating with components of the smart NIC 140. Pursuant to block 308, responsive to these communications, the BMC 129 manages the platform 100-1, including the BMC 129, via the signal interface 151, managing the host 101 and the BMC 129 managing the smart NIC 140.

Figure 4:
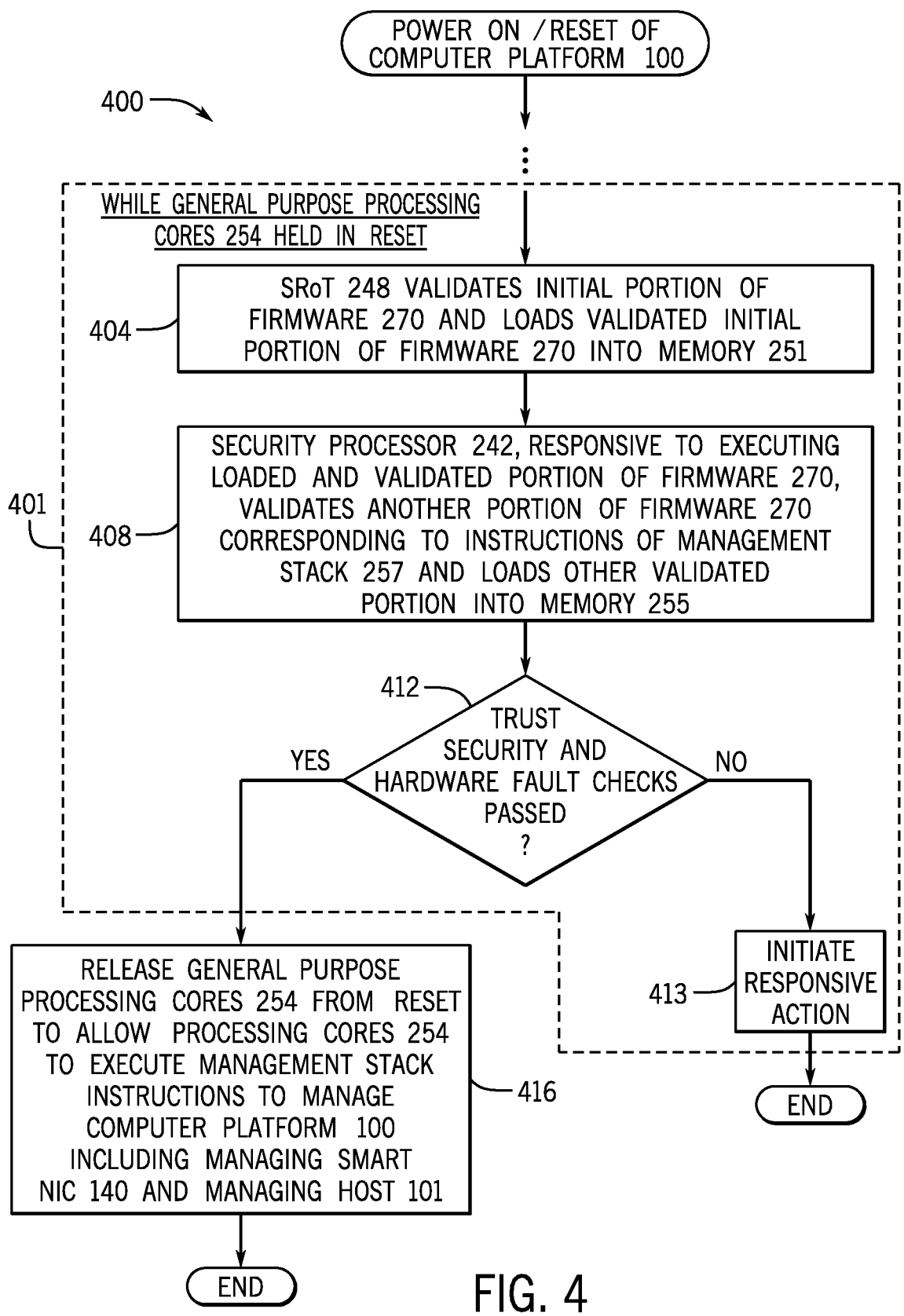
FIG. 4 is a flow diagram illustrating management of a boot process of a host of the computer platform by a smart NIC-located BMC according to an example implementation.

As an example of the BMC's management of the host 101, in accordance with some implementations, the BMC 129 may manage the boot of the host 101, as depicted by example process 400 of FIG. 4. Referring to FIG. 4 in conjunction with FIGS. 1A and 2, in accordance with some implementations, after being powered on or reset, the BMC 129 holds its general purpose processing core(s) 254 in reset until certain actions are performed, as indicated by the dashed line box 401 of FIG. 4. In this manner, after initial root of trust security checks as well as other checks (e.g., hardware fault checks) of the computer platform 100-1 pass (e.g., no security checks or hardware fault checks fail), the BMC 129 releases the general purpose processing core(s) 254 from reset.

In accordance with example implementations, the secure enclave 240 stores an immutable fingerprint, which is used by the SRoT engine 243 to validate machine executable instructions. More specifically, in accordance with example implementations, in response to the BMC 129 being powered on or reset, the SRoT engine 243, pursuant to block 404, validates an initial portion of firmware 270 and loads the validated portion of the firmware 270 into a non-volatile memory 251 of the BMC 129 so that this firmware portion is now trusted. Pursuant to block 408, the security processor 242 is then allowed to boot and execute the loaded firmware instructions. By executing the firmware instructions, the security processor 242 may then, pursuant to block 408, validate another portion of the firmware 270, which corresponds to a portion of the management firmware stack 257; and after the validation of this portion of the management firmware stack 257, the security processor 242 may then load the validated portion into the memory 255 of the BMC 129. This portion of the management firmware stack 257 may then be executed by the general purpose processing core(s) 254, which causes the processing core(s) 254 to load additional portions of the firmware 270 and place the loaded portions into the memory 264. Access to the memory 264 may involve additional training and initialization steps (e.g., training and initialization steps set forth by the DDR4 specification). Those instructions may be executed from the validated portion of the management firmware stack 257 in the memory 255. In accordance with example implementations, the secure enclave 240 may lock the memory 255 to prevent modification or tampering with the validated portion(s) stored in the memory 255.

Pursuant to decision block 412, the BMC 129 determines whether the security and hardware fault checks that are performed by the BMC 129 have passed. If not, then, in accordance with example implementations, the BMC 129 may terminate, or end, the boot of the computer platform 100-1. Otherwise, the BMC 129 releases (block 416) the general purpose processing core(s) 254 from reset to allow the processing core(s) 254 to execute the management stack 257 to manage the computer platform 100-1, including managing the smart NIC 140 and the host 101.

Figure 5:
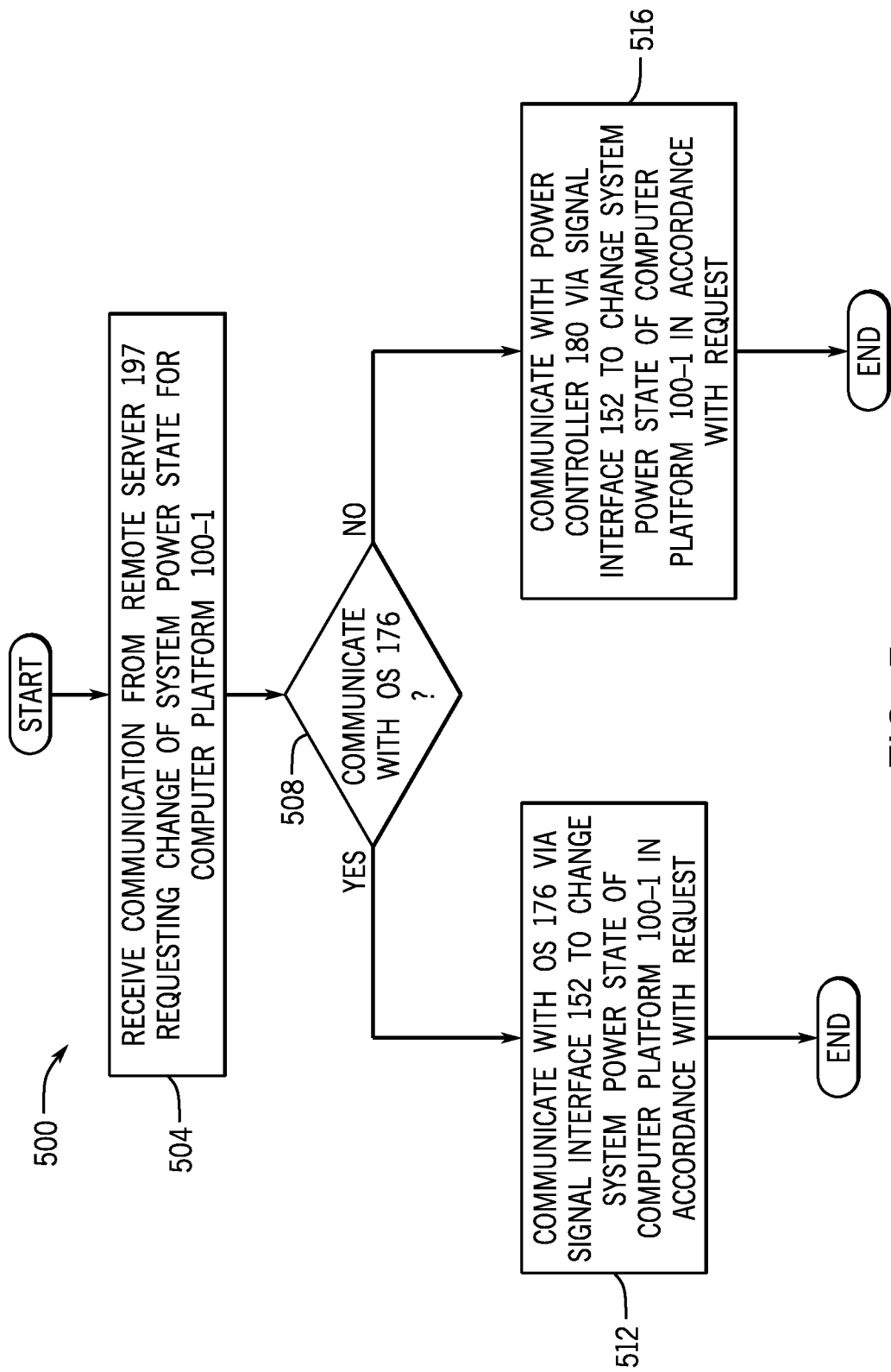
FIG. 5 is a flow diagram depicting management of a system power state by a smart NIC-located BMC according to an example implementation.

FIG. 5 depicts a process 500 of the BMC 129 for purposes of controlling a power system state of the computer platform 100-1. Referring to FIG. 5 in conjunction with FIGS. 1A and 2, in accordance with example implementations, the BMC 129 receives (block 504) a communication (e.g., a message containing a command) from the remote server 197 requesting a change of system power state for the computer platform 100-1. For example, the request may be a request to power down the computer platform 100-1; a request to reset the computer platform 100-1; a request to place the computer platform 100-1 in a hibernation mode of operation; and so forth. Pursuant to the process 500, the BMC 129 determines (decision block 508) whether the change in the system power state involves communication with the OS 176. For example, the computer platform 100-1 may be fully booted; and as such, control of power management may be accomplished using the OS 176. Conversely, in a pre-operating system environment, the BMC 129 may communicate with the boot services firmware 175, such as BIOS or UEFI firmware. As depicted in FIG. 5, if, pursuant to decision block 508, the BMC 129 determines that the OS 176 is involved, then, pursuant to block 512, the BMC 129 communicates, via the signaling interface 152, with the OS 176 to change the system power state in accordance with the request. Otherwise, pursuant to block 516, the BMC 129 communicates, pursuant to block 516, with either the power controller 180, or the BIOS or UEFI, via the signaling interface 152, to change the system power state.

Figure 6:
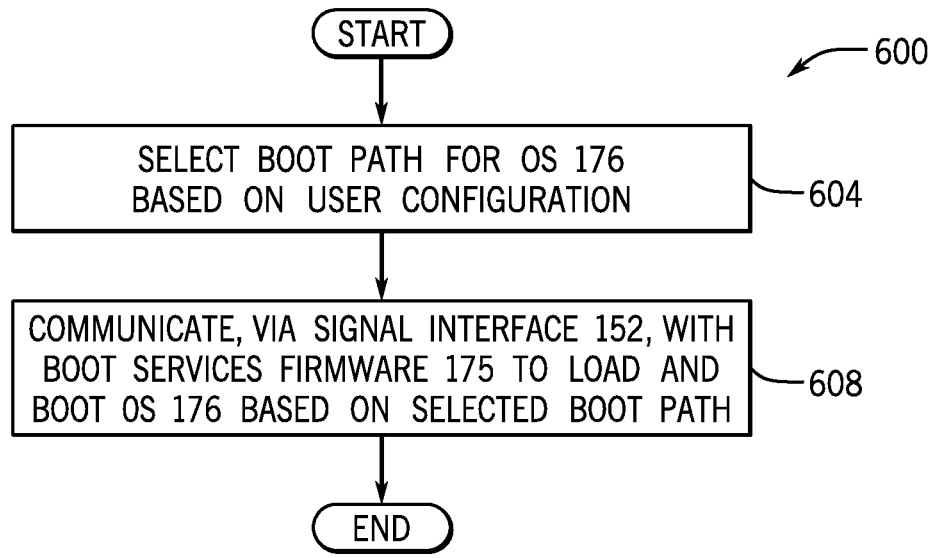
FIG. 6 is a flow diagram depicting management of a boot path for a host of the computer platform by a smart NIC-located BMC according to an example implementation.

FIG. 6 depicts another management process 600 of the BMC 129, in accordance with example implementations. This example process 600 relates to the BMC 129 controlling a boot path for the host 101. In this manner, the "boot path" refers to the path taken to load the operating system bootloader, acquire the OS image, acquire OS-related files, and so forth. Referring to FIG. 6 in conjunction with FIGS. 1A and 2, pursuant to block 604, the BMC 129 selects the boot path based on a particular boot path configuration. In this regard, the remote server 197 may, for example, communicate with the BMC 129 to select a virtual media device as the boot device; select a Preboot Execution Environment (PXE) network boot, and so forth. Pursuant to block 608, the BMC 129 communicates, via the signaling interface 152 with the boot services firmware 75 to effect the loading and booting of the operating system 176.

Figure 7:
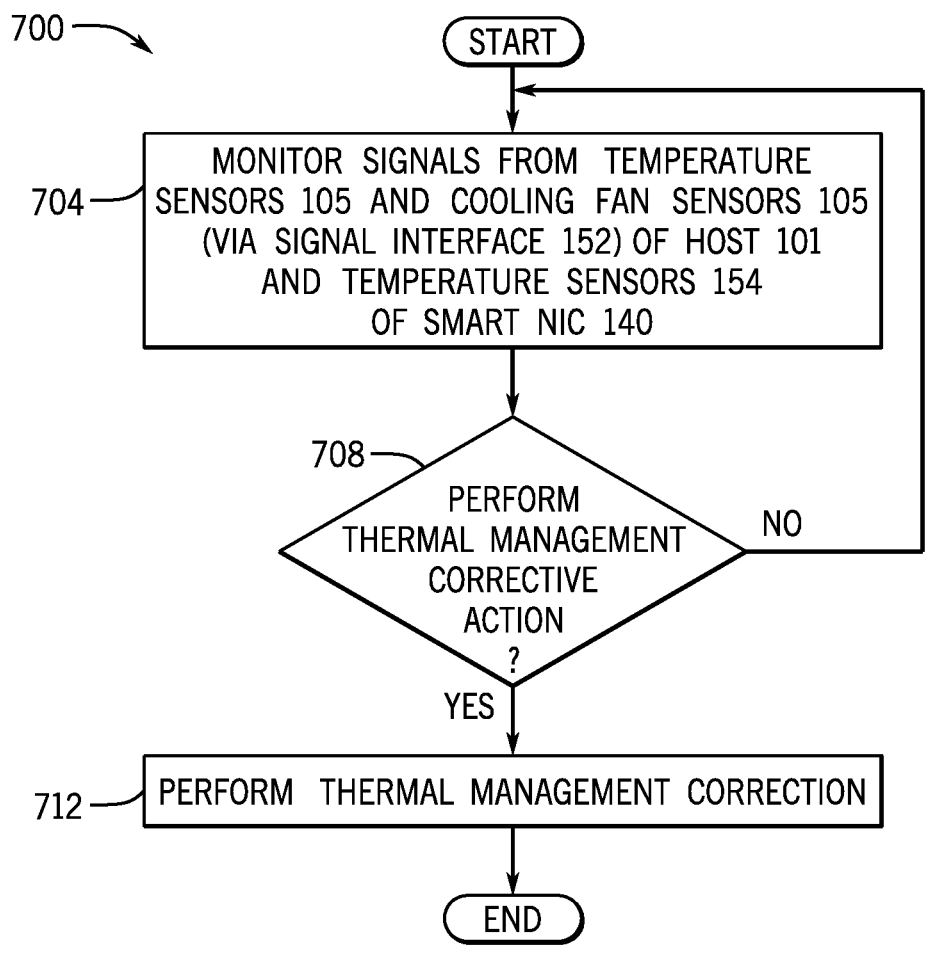
FIG. 7 is a flow diagram depicting thermal management of a computer platform by a smart NIC-located BMC according to an example implementation.

FIG. 7 depicts another example management process 700 of the BMC 129. Here, the process 700 illustrates a thermal management process. Referring to FIG. 7 in conjunction with FIGS. 1A, 1B and 2, pursuant to the process 700, the BMC 129 monitors (block 704) signals from cooling fan sensors 105 and temperature sensors 105 of the host 101 (via the signaling interface 152) and signals from temperature sensors 154 of the smart NIC 140 for purposes of assessing a thermal state for the host 101 and/or smart NIC 140. For example, this assessment may involve the BMC 129 determining that one or multiple temperatures of the host 101 or smart NIC 140 are outside of acceptable operating ranges. The BMC 129 may then, pursuant to decision block 708, determine that corrective action is to be employed. For example, corrective action may include turning on one or multiple cooling fans; increasing the speed of one or multiple cooling fans; powering off or down certain components of the host 101 or smart NIC 140, changing the system power state, and so forth. If thermal management corrective action is to be employed, then, pursuant to block 712, the BMC 129 takes the appropriate corrective action.

The BMC 129 may, in accordance with example implementations, perform management functions for the smart NIC 140, similar to management functions that are described above for the host 101. For example, via remote messaging, the BMC 129 may be remotely controlled to change a power state of the smart NIC 140 (e.g., turn off the smart NIC 140, reset the smart NIC 140, power up the smart NIC 140, and so forth); select a boot path for booting and loading the operating system 143 of the smart NIC 140; selecting and configuring virtual media for use by the smart NIC 140; updating firmware of the smart NIC 140; and so forth. Moreover, the BMC 129 may monitor one or multiple of the sensors 154 of the smart NIC; report environmental conditions and events to the remote server 197 derived from the monitoring; perform corrective action based on sensor monitoring by controlling components of the smart NIC 140; and so forth. The BMC 129 may, in accordance with example implementations, validate firmware that is executed by the processor(s) 142 of the smart NIC 140; detect hardware faults on the smart NIC 140; perform recovery actions in response to an operating system failure on the smart NIC 140; and so forth.

Because a single BMC 129 manages both the smart NIC 140 and the host 101, the single BMC 129 may coordinate and collaborate management actions for the host 101 with management actions for the smart NIC 140. Thus, as described herein, in accordance with example implementations, the single BMC 129 manages the entire computer platform 100-1, including managing the host 101 and managing the smart NIC 140. As apparent from the foregoing description, some of the management actions that are performed by the BMC 129 are directed solely to actions that are performed on the host 101, some of the management actions are directed solely to actions that performed on the smart NIC 140, and some of the management actions may involve both the host 101 and the smart NIC 140.

Figure 8:
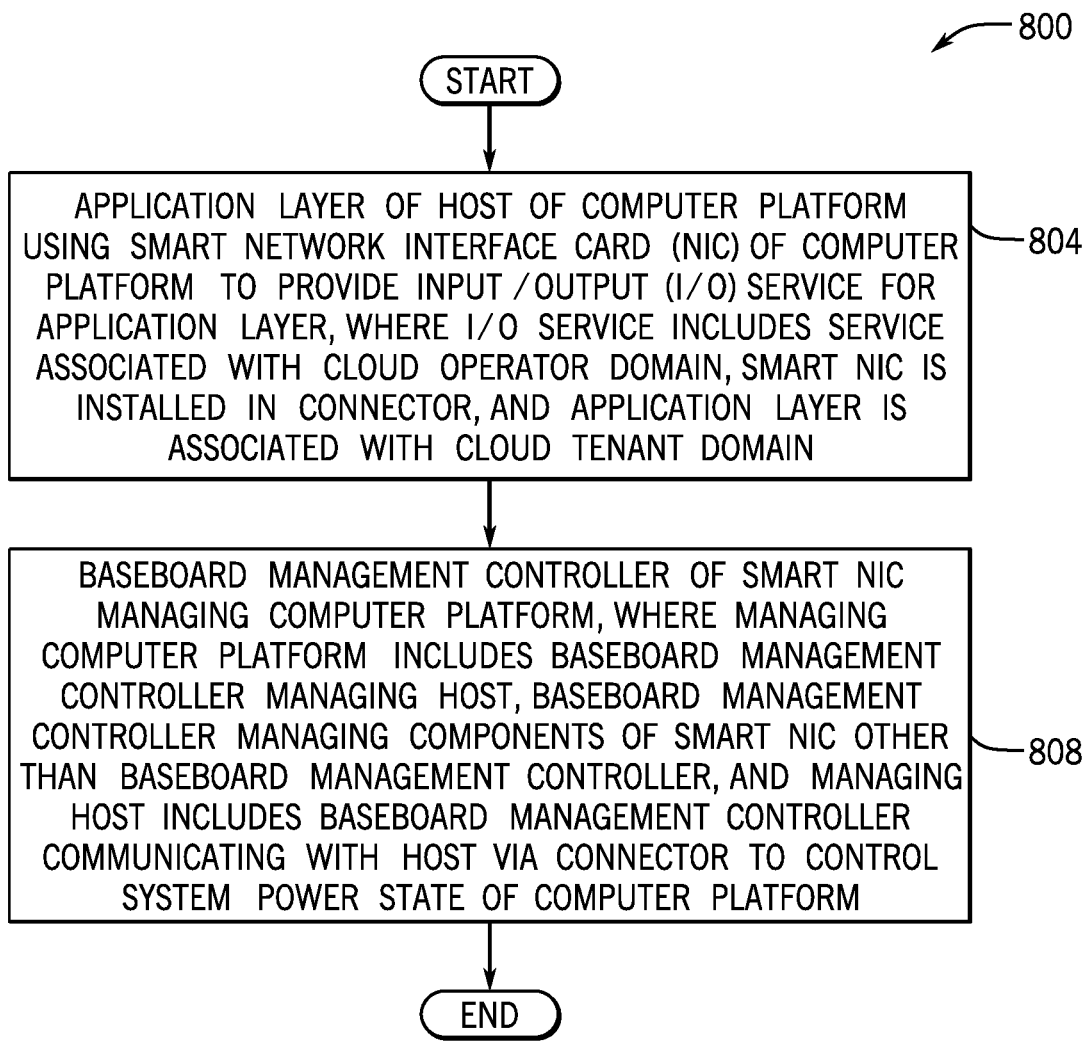
FIG. 8 is a flow diagram depicting a process to provide a smart NIC-located BMC to manage a computer platform according to an example implementation.

Referring to FIG. 8, in accordance with example implementations, a process 800 includes an application layer of a host of a computer platform using (block 804) a smart network interface card (NIC) of the computer platform to provide an input/output (I/O) service for the application layer. The I/O service includes a service that is associated with a cloud operator domain; the smart NIC is installed in a connector; and the application layers associated with a cloud tenant domain. The process 800 includes a baseboard management controller of the smart NIC managing (block 808) the computer platform. Managing the computer platform includes the baseboard management controller managing the host; the baseboard management controller managing components of the smart NIC other than the baseboard management controller; and managing the host includes the baseboard management controller communicating with the host via the connector to control a system power state of the computer platform.

Figure 9:
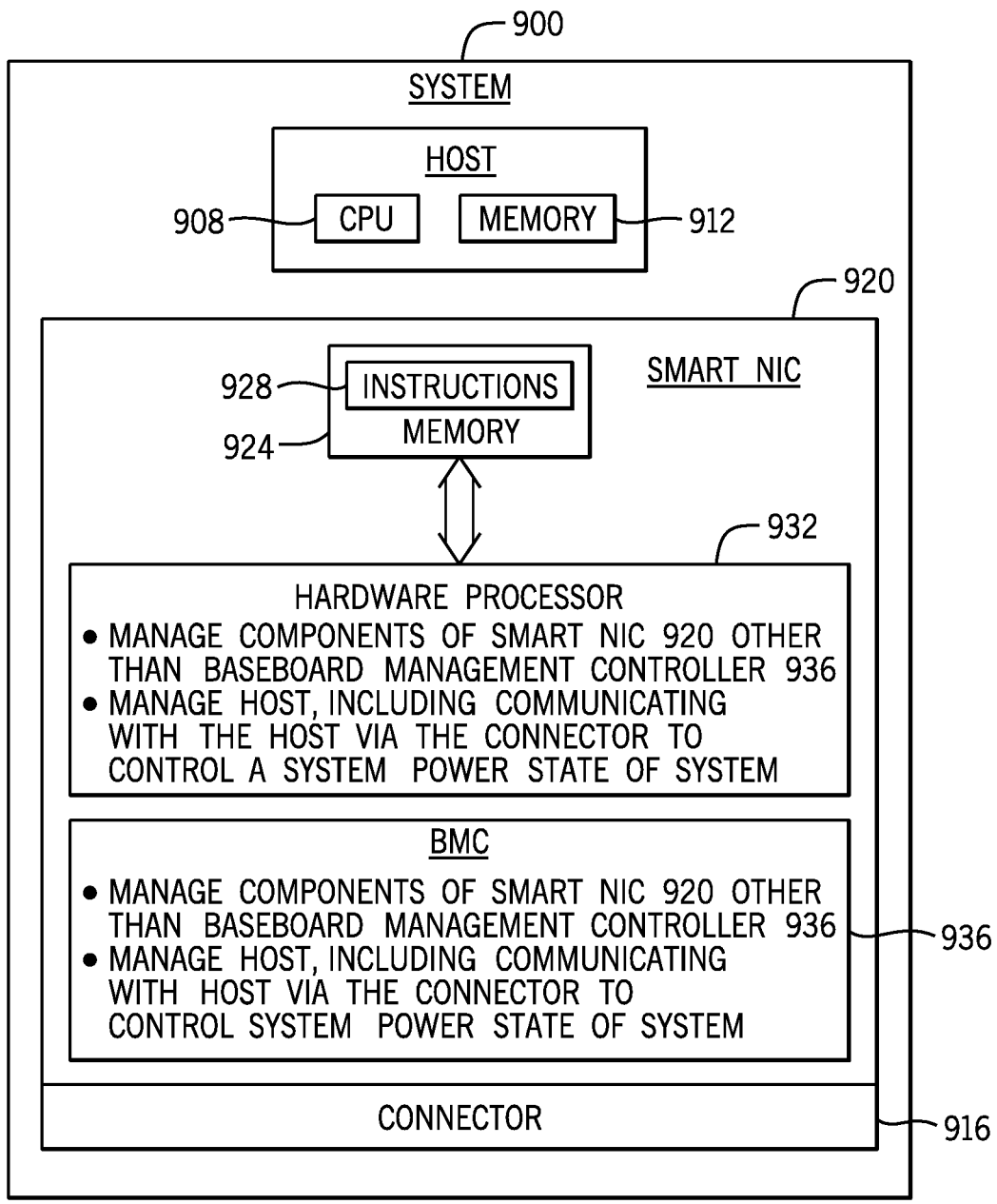
FIG. 9 is a schematic diagram of a system that includes a host, a smart NIC and a BMC of the smart NIC, which manages the system according to an example implementation.

Referring to FIG. 9, in accordance with example implementations, a system 900 includes a host 904; a connector 916; and a smart network interface card (NIC) 920 to be installed in the connector 916. The host 904 includes a central processing unit (CPU) 908 and a memory 912. The smart NIC 920 includes a memory 924; at least one hardware processor 932; and a baseboard management controller 936. The hardware processor(s) 932 executes instructions 928 that are stored in the memory 924 to provide an input/output (I/O) service for the host 904 other than network communication. The I/O service is associated with a cloud operator domain. The baseboard management controller 936 manages components of the smart NIC 920 other than the baseboard management controller 936; and manages the host 904, including communicating with the host 904 via the connector 916 to control a system power state.

Figure 10:
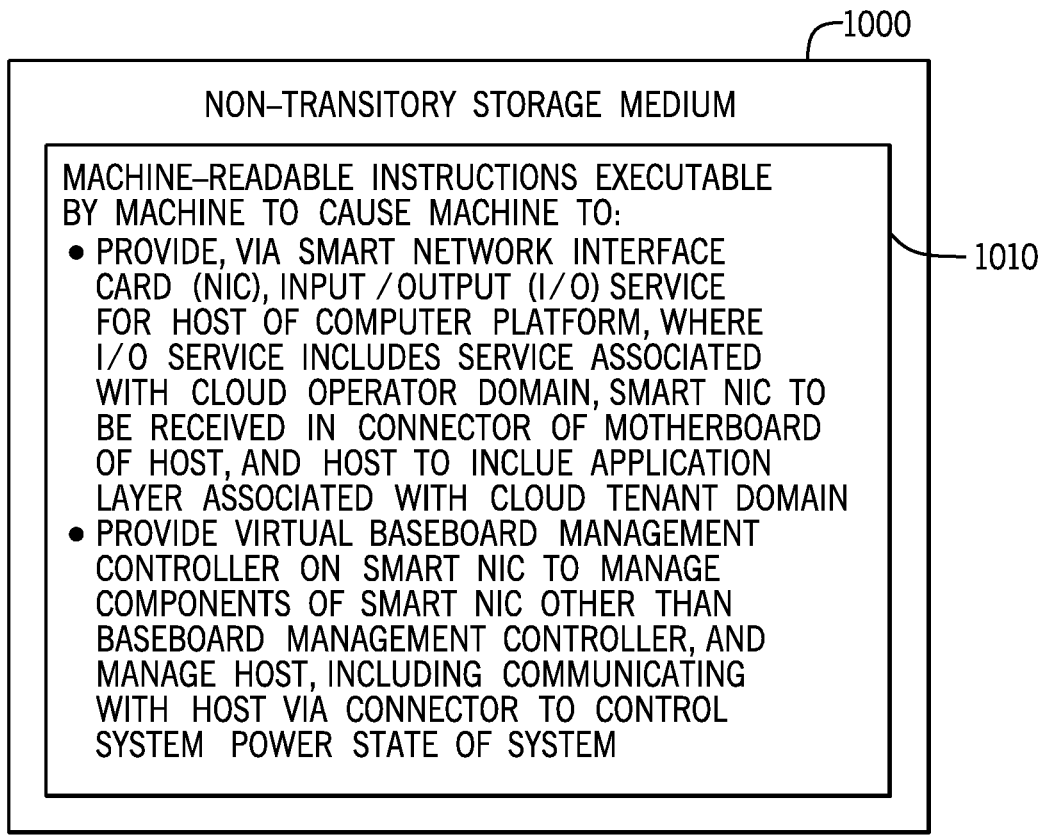
FIG. 10 is an illustration of instructions stored on a non-transitory machine-readable storage medium that, when executed by a machine, cause the machine to provide a virtual BMC on a smart NIC to manage a system including the smart NIC and a host of the system according to an example implementation.

Referring to FIG. 10, in accordance with example implementations, a non-transitory storage medium 1000 stores machine-readable instructions 1010 that, when executed by the machine, cause the machine to provide, via a smart network interface card (NIC) an input/output (I/O) service for a host of a computer platform. The I/O service includes a service that is associated with a cloud operator domain; the smart NIC is to be received in a connector of a motherboard of the host; and the host to include an application layer that is associated with a cloud tenant domain. The instructions 1010, when executed by the machine, further cause the machine to provide a virtual baseboard management controller on the smart NIC to manage components of the smart NIC other than the baseboard management controller; and manage the host. Managing the host includes communicating with the host via the connector to control a system power state.

In accordance with example implementations, managing the platform includes the smart NIC executing instructions to provide a virtual baseboard management controller. A particular advantage is that dedicated hardware is not used for the baseboard management controller.

In accordance with example implementations, using the smart NIC to provide the I/O service includes at least one central processing unit (CPU) of the smart NIC executing instructions to provide the I/O service; and the baseboard management controller managing the computer platform further includes an embedded hardware subsystem of the smart NIC other than the CPU(s) managing the computer platform. A particular advantage is that a single baseboard management controller may manage both the smart NIC and the host.

In accordance with example implementations, the smart NIC is installed in a connector of the computer platform; and the baseboard management controller managing the computer platform further includes the baseboard management controller communicating, via the connector, telemetry signals with components of the host. Managing the computer platform further includes the baseboard management controller communicating, via the connector, with at least one general purpose central processing unit (CPU) of the host; and the CPU(s) is associated with the application layer. A particular advantage is that a single baseboard management controller may be used to manage both the smart NIC and the host.

In accordance with example implementations, the host may include an application layer that is associated with a cloud tenant domain; the cloud tenant domain may include an untrusted domain; the cloud operator domain may include a trusted domain; and the baseboard management controller may be associated with the cloud operator domain. A particular advantage is that a single baseboard management controller may be used to manage both the host and the smart NIC in a cloud-centric application.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   an application layer of a host of a computer platform using a smart network interface card (NIC) of the computer platform to provide an input/output (I/O) service for the application layer, wherein the I/O service comprises a service associated with a cloud operator domain, the smart NIC is installed in a connector, and the application layer is associated with a cloud tenant domain; and
   a baseboard management controller of the smart NIC managing the computer platform, wherein managing the computer platform comprises:
   the baseboard management controller managing the host;
   the baseboard management controller managing components of the smart NIC other than the baseboard management controller, wherein managing components of the smart NIC other than the baseboard management controller comprises the baseboard management controller, responsive to remote messaging, changing a power state of the smart NIC; and
   managing the host comprises the baseboard management controller communicating with the host via the connector to control a system power state of the computer platform.

2. The method of claim 1, wherein the baseboard management controller managing the computer platform comprises the smart NIC executing instructions to provide a virtual baseboard management controller.

3. The method of claim 1, wherein:
using the smart NIC to provide the I/O service comprises at least one central processing unit (CPU) of the smart NIC executing instructions to provide the I/O service; and
the baseboard management controller managing the computer platform further comprises an embedded hardware subsystem of the smart NIC other than the at least one CPU managing the computer platform.

4. The method of claim 1, wherein:
the smart NIC is installed in a connector of the computer platform;
the baseboard management controller managing the computer platform further comprises the baseboard management controller communicating, via the connector, telemetry signals with components of the host;
the baseboard management controller managing the computer platform further comprises the baseboard management controller communicating, via the connector, with at least one general purpose central processing unit (CPU) of the host; and
the at least one general purpose CPU is associated with the application layer.

5. The method of claim 1, wherein the baseboard management controller managing components of the smart NIC other than the baseboard management controller further comprises the baseboard management controller selecting a boot path for loading an operating system of the smart NIC.

6. The method of claim 1, wherein the baseboard management controller managing components of the smart NIC other than the baseboard management controller further comprises the baseboard management controller updating firmware of the smart NIC.

7. The method of claim 1, wherein the baseboard management controller managing components of the smart NIC other than the baseboard management controller further comprises the baseboard management controller performing a management action solely directed to the smart NIC and not directed to the host.

8. A system comprising:
a host comprising a central processing unit (CPU) and a memory;
a connector; and
a smart network interface card (NIC) to be installed in the connector, wherein the smart NIC comprises:
  a memory to store instructions;
  at least one hardware processor to execute the instructions to provide an input/output (I/O) service for the host other than network communication, wherein the I/O service is associated with a cloud operator domain; and
  a baseboard management controller to:
    manage components of the smart NIC other than the baseboard management controller, wherein managing components of the smart NIC other than the baseboard management controller comprises the baseboard management controller, responsive to remote messaging, changing a power state of the smart NIC; and
    manage the host, wherein managing the host comprises comprising communicating with the host via the connector to control a system power state.

9. The system of claim 8, wherein the baseboard management controller comprises a virtual baseboard management controller, and the at least one hardware processor to further execute the instructions to provide the virtual baseboard management controller.

10. The system of claim 8, wherein the baseboard management controller comprises an embedded hardware subsystem separate from the at least one hardware processor, and the embedded hardware subsystem comprises an embedded hardware processor to execute instructions to manage the system.

11. The system of claim 8, wherein:
the host further comprises an application layer associated with a cloud tenant domain;
the cloud tenant domain comprises an untrusted domain;
the cloud operator domain comprises a trusted domain; and
the baseboard management controller is associated with the cloud operator domain.

12. The system of claim 11, wherein the CPU comprises at least one hardware processor to further execute the instructions to perform the I/O service in response to a request from the application layer.

13. The system of claim 8, further comprising:
a circuit substrate separate from the smart NIC, wherein the CPU, and the connector are mounted to the circuit board substrate.

14. The system of claim 8, wherein the connector comprises a Datacenter-ready Secure Control Interface (DC-SCI).

15. The system of claim 8, wherein the at least one hardware processor to further execute the instructions to communicate, via the connector, telemetry signals for the baseboard management controller with components of the host, and communicate, via the connector, signals associated with a host interface of the baseboard management controller.

16. The system of claim 8, wherein the baseboard management controller comprises a hardware root of trust.

17. The system of claim 8, wherein the at least one hardware processor to execute the instructions to provide a virtualization service for the host.

18. The system of claim 8, wherein the at least one hardware processor to execute the instructions to provide a virtualized network for the host.

19. The system of claim 8, wherein the at least one hardware processor to execute the instructions to provide a network function virtualization for the host.

20. The system of claim 8, wherein the at least one hardware processor to execute the instructions to provide at least one of a storage service for the host, a network security service for the host, or a network control plane service for the host.

21. A non-transitory storage medium to store machine-readable instructions that, when executed by a machine, cause the machine to:
provide, via a smart network interface card (NIC), an input/output (I/O) service for a host of a computer platform, wherein the I/O service comprises a service associated with a cloud operator domain, the smart NIC to be received in a connector of a motherboard of the host, and the host to comprise an application layer associated with a cloud tenant domain; and
provide a virtual baseboard management controller on the smart NIC to manage components of the smart NIC other than the virtual baseboard management controller, and manage the host, comprising communicating with the host via the connector to control a system power state, wherein managing components of the smart NIC other than the virtual baseboard management controller comprises the virtual baseboard management controller, responsive to remote messaging, changing a power state of the smart NIC.

22. The storage medium of claim 21, wherein the instructions, when executed by the machine, further cause the machine to provide at least one of a network security service for the application layer, a network storage service for the application layer, a virtualized function for the application layer, or a virtual network for the application layer.

23. The storage medium of claim 21, wherein the instructions, when executed by the machine, further cause the machine to:
   using the connector, communicate telemetry signals with components of the motherboard; and
   using the connector, communicate bus interface requests and responses with a host central processing unit (CPU) of the motherboard.

\* \* \* \* \*